United States Patent
Townsend et al.

(10) Patent No.: US 9,645,982 B2
(45) Date of Patent: May 9, 2017

(54) SYSTEM AND METHOD FOR LOADING A WEB PAGE

(71) Applicant: Google Inc., Mountain View, CA (US)

(72) Inventors: Bradley David Townsend, Santa Ana, CA (US); Brian Kuhn, Lake Forest, CA (US); Xin Liu, Irvine, CA (US)

(73) Assignee: Google Inc., Mountain View, CA (US)

( * ) Notice: Subject to any disclaimer, the term of this patent is extended or adjusted under 35 U.S.C. 154(b) by 437 days.

(21) Appl. No.: 13/838,978

(22) Filed: Mar. 15, 2013

(65) Prior Publication Data

US 2017/0103049 A1    Apr. 13, 2017

(51) Int. Cl.
*G06F 17/22* (2006.01)

(52) U.S. Cl.
CPC ................................. *G06F 17/2247* (2013.01)

(58) Field of Classification Search
CPC ......... H04L 67/02; H04L 67/10; H04L 67/26; H04L 67/42; H04L 67/1038; H04L 63/0428; G06F 17/30578; G06F 9/3005
See application file for complete search history.

(56) References Cited

U.S. PATENT DOCUMENTS

| | | | | |
|---|---|---|---|---|
| 6,055,579 A * | 4/2000 | Goyal | ............... | G06F 9/4881 712/28 |
| 6,151,610 A * | 11/2000 | Senn | ............... | G06F 17/30011 707/E17.008 |
| 6,895,482 B1 * | 5/2005 | Blackmon | ............... | G06F 9/3824 710/112 |
| 7,509,584 B2 * | 3/2009 | Moser | ............... | 715/760 |
| 7,689,665 B2 * | 3/2010 | Lipton et al. | ............... | 709/217 |
| 7,743,392 B2 | 6/2010 | Mallet et al. | | |
| 7,802,238 B2 * | 9/2010 | Clinton | ............... | G05B 23/0213 700/10 |

(Continued)

OTHER PUBLICATIONS

Microsoft, MSDN—"ClientScriptManager. RegisterClientScriptBlock Method", 2011, msdn.microsoft.com, https://web.archive.org/web/20111109091445/http://msdn. microsoft.com/en-us/library/bahh2fef(v=VS.110).aspx, p. 2.*

*Primary Examiner* — Frank D Mills
*Assistant Examiner* — Warren Campbell, Jr.
(74) *Attorney, Agent, or Firm* — Foley & Lardner LLP; John D. Lanza (57) ABSTRACT

A method for loading a web page is provided. Primary executable script are asynchronously loaded. Commands associated with the primary executable script are pushed onto a first queue and processed by asynchronously loading secondary executable script if the command is a dependency command and pushing the dependency command onto a second queue; registering secondary executable script referenced in the command if the command is a fulfillment command, and pushing the command onto the second queue if the command is neither a dependency nor a fulfillment command. Commands in the second queue are processed by, if the command is a dependency command, determining if the secondary executable script referenced in the dependency command is registered, and associating the secondary executable script with an object if the secondary executable script is registered. If the command is not a dependency command, then the command is executed and removed from the second queue.

20 Claims, 6 Drawing Sheets

(56) References Cited

U.S. PATENT DOCUMENTS

| | | | |
|---|---|---|---|
| 7,882,173 B2 | 2/2011 | Hirsch et al. | |
| 8,051,425 B2 | 11/2011 | Godman et al. | |
| 8,065,659 B1* | 11/2011 | Prince | G06F 9/445 |
| | | | 717/115 |
| 8,713,424 B1* | 4/2014 | Kuhn | G06F 17/30902 |
| | | | 715/234 |
| 2009/0031210 A1* | 1/2009 | Backhouse | G06F 17/3089 |
| | | | 715/234 |
| 2013/0055063 A1* | 2/2013 | Mondal | G06F 9/4552 |
| | | | 715/234 |
| 2013/0339485 A1* | 12/2013 | Sen | G06F 9/44521 |
| | | | 709/219 |

* cited by examiner

SYSTEM AND METHOD FOR LOADING A WEB PAGE

BACKGROUND

The present disclosure generally relates to managing scripts to load a web page, and in particular, to loading interdependent scripts (e.g., plug-ins) from an asynchronous queue.

Software components are commonly downloaded as plug-ins to add specific abilities to software applications. The components may be individually specified and downloaded by a user to customize the functionalities of an application. The incorporation of multiple components into software applications, however, may result in a variety of issues.

SUMMARY

The disclosed subject matter relates to a machine-implemented method for loading a web page. Primary executable script referenced in the web page is asynchronously loaded. Commands associated with the primary executable script are pushed onto a first queue. Each of the commands in the first queue is processed. The processing of each of the commands in the first queue includes: i) asynchronously loading secondary executable script referenced in the command if the command is a dependency command and pushing the dependency command onto a second queue, ii) registering secondary executable script referenced in the command if the command is a fulfillment command, and iii) pushing the command onto the second queue if the command is neither a dependency command nor a fulfillment command. Each of the commands in the second queue is also processed. The processing of each of the commands in the second queue includes, if the command is a dependency command, i) determining if the secondary executable script referenced in the dependency command is registered, and ii) associating the secondary executable script with an object if the secondary executable script referenced in the dependency command is registered. If the command is not a dependency command, then the command is executed and removed from the second queue.

The disclosed subject matter also relates to a machine-readable medium comprising instructions stored therein, which when executed by a system, cause the system to perform operations comprising asynchronously loading a primary executable script referenced in the web page. Commands associated with the primary executable script are pushed onto a first queue. Each of the commands in the first queue is processed. The processing of each of the commands in the first queue includes: i) asynchronously loading secondary executable script referenced in the command if the command is a dependency command and pushing the dependency command onto a second queue, ii) registering secondary executable script referenced in the command if the command is a fulfillment command, and iii) pushing the command onto the second queue if the command is neither a dependency command nor a fulfillment command. Each of the commands in the second queue is also processed. The processing of each of the commands in the second queue includes, if the command is a dependency command, i) determining if the secondary executable script referenced in the dependency command is registered, ii) associating the secondary executable script with an object if the secondary executable script referenced in the dependency command is registered, iii) removing the dependency command from the second queue after the secondary executable script has been associated with the object, and iv) removing any commands remaining in the second queue and appending the removed commands to the first queue if the secondary executable script referenced in the dependency command is not registered. If the command is not a dependency command, then the command is executed and removed from the second queue.

According to various aspects of the subject technology, a system for loading a web page is provided. The system includes one or more processors and a machine-readable medium comprising instructions stored therein, which when executed by the processors, cause the processors to perform operations comprising asynchronously loading a primary executable script referenced in the web page. Commands associated with the primary executable script are pushed onto a first queue. Each of the commands in the first queue is processed. The processing of each of the commands in the first queue includes: i) asynchronously loading secondary executable script referenced in the command if the command is a dependency command and pushing the dependency command onto a second queue, ii) registering secondary executable script referenced in the command if the command is a fulfillment command, and iii) pushing the command onto the second queue if the command is neither a dependency command nor a fulfillment command. Each of the commands in the second queue is also processed. The processing of each of the commands in the second queue includes, if the command is a dependency command, i) determining if the secondary executable script referenced in the dependency command is registered, and ii) associating the secondary executable script with an object if the secondary executable script referenced in the dependency command is registered. If the command is not a dependency command, then the command is executed and removed from the second queue.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

The disclosed subject matter relates to a machine-implemented method for loading a web page. Primary executable script referenced in the web page are asynchronously loaded. Commands associated with the primary executable script are pushed onto a first queue. Each of the commands in the first queue is processed. The processing of each of the commands in the first queue includes: i) asynchronously loading secondary executable script referenced in the command if the command is a dependency command and pushing the dependency command onto a second queue, ii) registering secondary executable script referenced in the command if the command is a fulfillment command, and iii) pushing the command onto the second queue if the command is neither a dependency command nor a fulfillment command. Each of the commands in the second queue is also processed. The processing of each of the commands in the second queue includes, if the command is a dependency command, i) determining if the secondary executable script referenced in the dependency command is registered, and ii) associating the secondary executable script with an object if the secondary executable script referenced in the dependency command is registered. If the command is not a dependency command, then the command is executed and removed from the second queue.

When a user navigates to a web page, the script referenced in the web page is loaded and executed. The script may be executed asynchronously by utilizing a first queue and a second queue. The asynchronous execution allows certain designated script to be executed in the background while other script are concurrently executed. In order to do this, an application programming interface (API) (e.g., _require) that indicates a dependency may be used. The first argument of the API may be the name of the interdependent script (e.g., a plug-in). This will indicate that every subsequent command after the API call with the dependency can't be executed until an interdependent script with a given name corresponding to the argument has been loaded. The interdependent script can be loaded in many ways (e.g., automatically downloaded from the web).

In the example of a plug-in, the dependency API not only initiates the loading of the plug-in script, but also creates an instance of the plug-in and attaches it to a calling object when the plug-in becomes available. Additionally, subsequent commands are not executed until the one or more dependencies have been fulfilled. In order to signal the fulfillment of a dependency, a fulfillment API (e.g., _provide) may be used. The fulfillment API includes two parameters, the first being the name of the plug-in being provided, which must match the name given in the call to the dependency API, and the second parameter being a constructor function from which the script creates instances of the plug-in. For example, a new instance of a plug-in named "foo" is created each time you call "_require foo". This is particularly useful if the foo plug-in is to be applied to multiple objects. Once the fulfillment API has been provided, subsequent commands of the script are executed until another dependency API is presented in the script.

Figure 1:
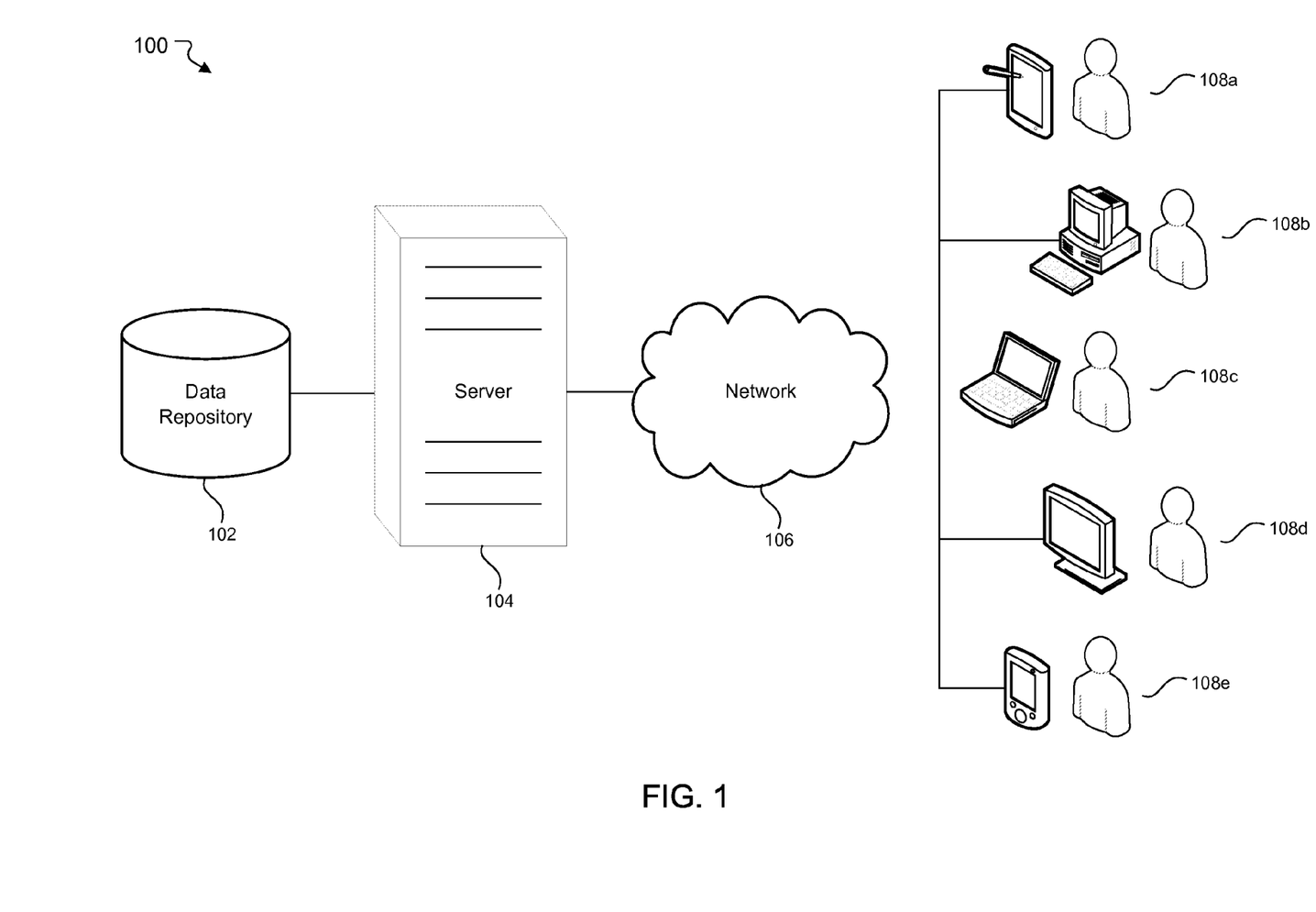
FIG. 1 illustrates an example network environment which provides for loading a web page.

FIG. 1 illustrates an example network environment which provides for loading a web page. Network environment 100 includes a data repository 102 (e.g., computer-readable storage media) for storing a variety of data accessed by web-based applications. While the network environment 100 includes a single data repository 102 in FIG. 1, the network environment may include additional data repositories in some implementations. Data repository 102 may store web page information as well as plug-ins associated with the web pages.

The network environment 100 further includes server 104. While the network environment 100 includes a single server in FIG. 1, the network environment may include several interconnected servers in some implementations. Server 104 may receive requests from user-operated client devices 108a-108e. Server 104 and client devices 108a-108e may be communicatively coupled through a network 106. In some implementations, client devices 108a-108e may request data from server 104. Upon receiving the request, server 104 may retrieve a set of data from data repository 102 and serve the set of data to client devices 108a-108e in order to generate the requested web page.

Client devices 108a-108e represent various forms of processing devices. Examples of a processing device include a desktop computer, a laptop computer, a handheld computer, a television coupled to a processor or having a processor embedded therein, a personal digital assistant (PDA), a network appliance, a camera, a smart phone, a media player, a navigation device, an email device, a game console, or a combination of any these data processing devices or other data processing devices.

In some aspects, client devices 108a-108e may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some aspects, network environment 100 can be a distributed client/server system that spans one or more networks such as network 106. Network 106 can be a large computer network, such as a local area network (LAN), wide area network (WAN), the Internet, a cellular network, or a combination thereof connecting any number of mobile clients, fixed clients, and servers. In some aspects, each client (e.g., client devices 108a-108e) can communicate with servers 104 via a virtual private network (VPN), Secure Shell (SSH) tunnel, or other secure network connection. In some aspects, network 106 may further include a corporate network (e.g., intranet) and one or more wireless access points.

Figure 2:
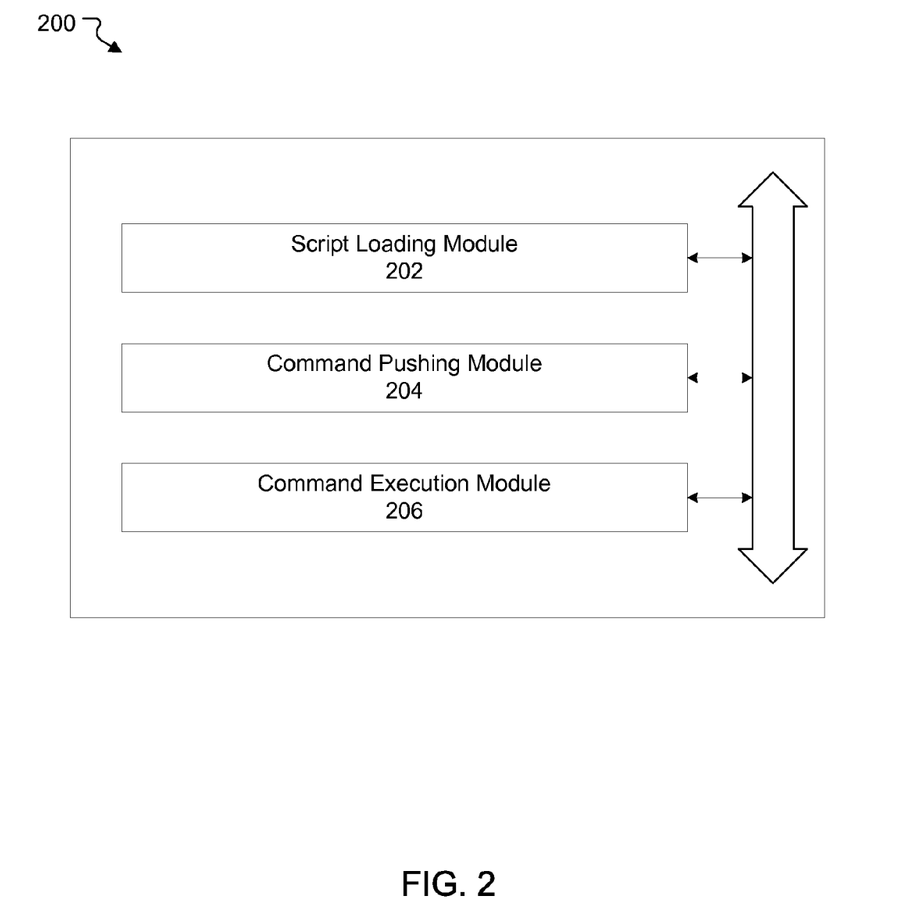
FIG. 2 illustrates an example of a server system for loading a web page.

FIG. 2 illustrates an example of a system for loading a web page. System 200 includes script loading module 202, command pushing module 204, and command execution module 206. These modules, which are in communication with one another, process information retrieved from data repository 102 in order to load a web page for display. For example, a user may navigate to a particular web page, where the web page is loaded by execution of script referenced in the web page. The script may be loaded by script loading module 202 for execution. During execution, certain commands may be pushed from a first queue to a second queue by command pushing module 204 so that asynchronous execution may be performed. For example, a dependency API may cause an interdependent script such as a plug-in to be loaded in the background while other script continue to be executed, which helps expedite the loading of web pages. The commands on each of the first and second queues are executed by command execution module 206.

In some aspects, the modules may be implemented in software (e.g., subroutines and code). The software implementation of the modules may operate on web browsers running on client devices 108a-108e. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
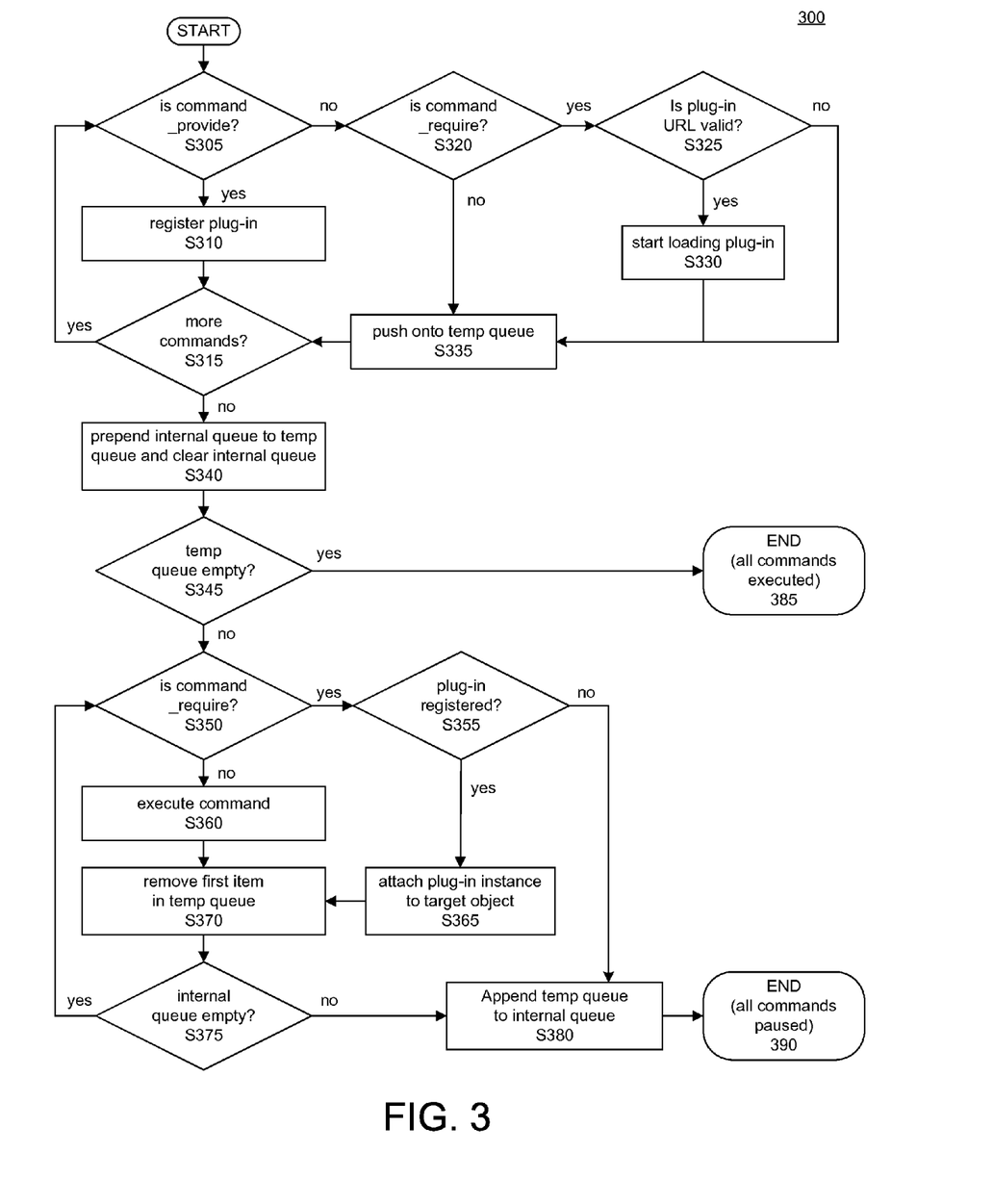
FIG. 3 illustrates an example method for loading a web page.

FIG. 3 illustrates example method 300 for loading a web page. Each of a set of commands in a first queue is processed by first identifying whether a current command is a fulfillment command (e.g., _provide command) in S305. If the command is a fulfillment command, then a secondary executable script (e.g., a plug-in) corresponding to the fulfillment command is registered in S310. However, if the command is not a fulfillment command, then a determination whether the current command is a dependency command (e.g., _require command) is made in S320. If the command is a dependency command, then a secondary executable script referenced in the command is asynchronously loaded in S330, and the command is pushed onto a second queue (e.g., a temporary queue) in S335. In some aspects, the secondary executable script is asynchronously loaded in S330 only if the Uniform Resource Locator (URL) in the dependency command is determined to be valid in S325. Otherwise, the command is pushed onto the second queue in S335. In S315, a determination whether there are any more commands in the set of commands is made. If additional commands exist, the next command in the set of commands is processed in a similar fashion.

Once all of the commands in the set of commands have been processed, the first queue (e.g., the internal queue) from which the commands are derived is prepended to the second queue and processing of commands in the second queue is commenced. In S345, a determination is made whether the second queue is empty. If the second queue is determined to be empty, then the processing ends in S385, as all commands have been executed. However, if the second queue is determined to not be empty, then a determination is made as to whether or not a current command in the second queue is a dependency command in S350. If the current command is not a dependency command, then the current command is executed in S360. The command is then removed from the second queue in S370. In S375, a determination is made as to whether the first queue is empty. If the first queue is empty, then the process reverts to S350 and the next command in the second queue is processed.

If the current command is determined to be a dependency command in S350, then a determination is made whether the secondary executable script referenced in the dependency command is registered in S355. If the secondary executable script is registered, then the secondary executable script is associated with a target object in S365. If the secondary executable script is determined to not be registered in S355, or if the first queue is determined to not be empty in S375, the second queue is appended to the first in S380 and all commands are then paused in S390. Appending the second queue to the first queue in S380 assures that any new commands that are added to the first queue are processed before the continuation of the execution of the second queue.

Figure 4:
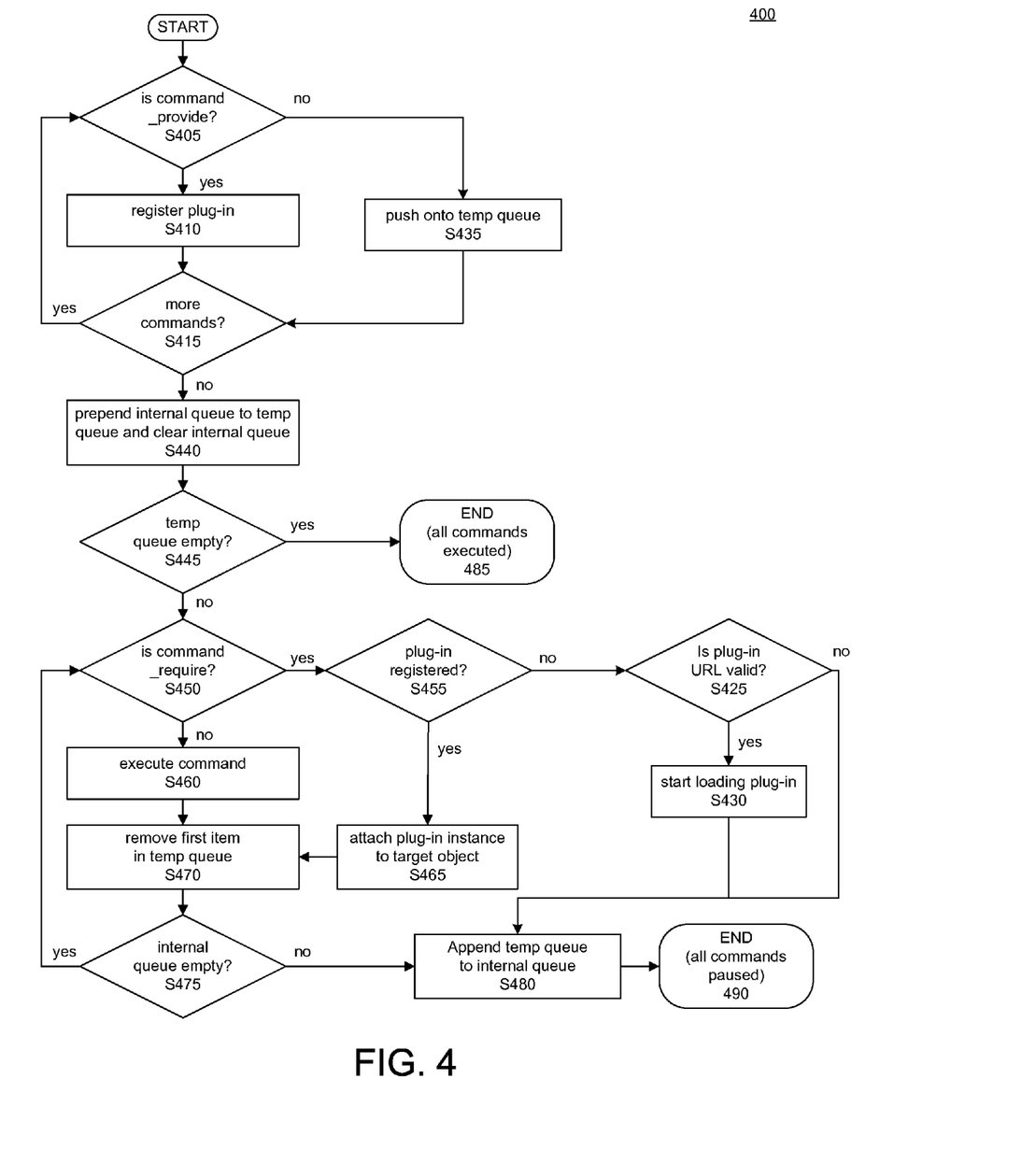
FIG. 4 illustrates another example method for loading a web page.

FIG. 3 illustrates one example method for loading a web page, however, other methods may also be used. Other methods may use additional steps, fewer steps, alternative steps, and/or execute steps in different order. For example, FIG. 4 illustrates another example method 400 for loading a web page.

In method 400, each of a set of commands in a first queue is processed by first identifying whether a current command is a fulfillment command (e.g., _provide command) in S405. If the command is a fulfillment command, then a secondary executable script (e.g., a plug-in) corresponding to the fulfillment command is registered in S410. However, if the command is not a fulfillment command, then the command is pushed onto a second queue (e.g., a temporary queue) in S435. In S415, a determination whether there are any more commands in the set of commands is made. If additional commands exist, the next command in the set of commands is processed in a similar fashion.

Once all of the commands in the set of commands have been processed, the first queue (e.g., the internal queue) from which the commands are derived is prepended to the second queue and processing of commands in the second queue is commenced in S440. In S445, a determination is made whether the second queue is empty. If the second queue is determined to be empty, then the processing ends in S485, as all commands have been executed. However, if the second queue is determined to not be empty, then a determination is made as to whether or not a current command in the second queue is a dependency command in S450.

If the current command is not a dependency command, then the current command is executed in S460. The command is then removed from the second queue in S470. In S475, a determination is made as to whether the first queue is empty. If the first queue is empty, then the process reverts to S450 and the next command in the second queue is processed. If the first queue is determined to not be empty in S475, the second queue is appended to the first in S480 and all commands are then paused in S490.

Referring back to S450, if the current command is determined to be a dependency command in S450, then a determination is made whether the secondary executable script referenced in the dependency command is registered in S455. If the secondary executable script is registered in S455, then the secondary executable script is associated with a target object in S465. The command is then removed from the second queue in S470 and, in S475, a determination is made as to whether the first queue is empty. As described above, if the first queue is empty, then the process reverts to S450 and the next command in the second queue is processed. If the first queue is determined to not be empty in S475, the second queue is appended to the first in S480 and all commands are then paused in S490.

Referring back to S455, if the secondary executable script is determined to not be registered, a determination is made as to whether or not the Uniform Resource Locator (URL) in the dependency command is valid in S425. If the Uniform Resource Locator (URL) in the dependency command is determined to be valid, the secondary executable script (e.g., the plug-in) is asynchronously loaded in S430. After the secondary executable script is loaded, or if the URL in the dependency command is not valid, the second queue is appended to the first in S480 and all commands are then paused in S490.

Figure 5:
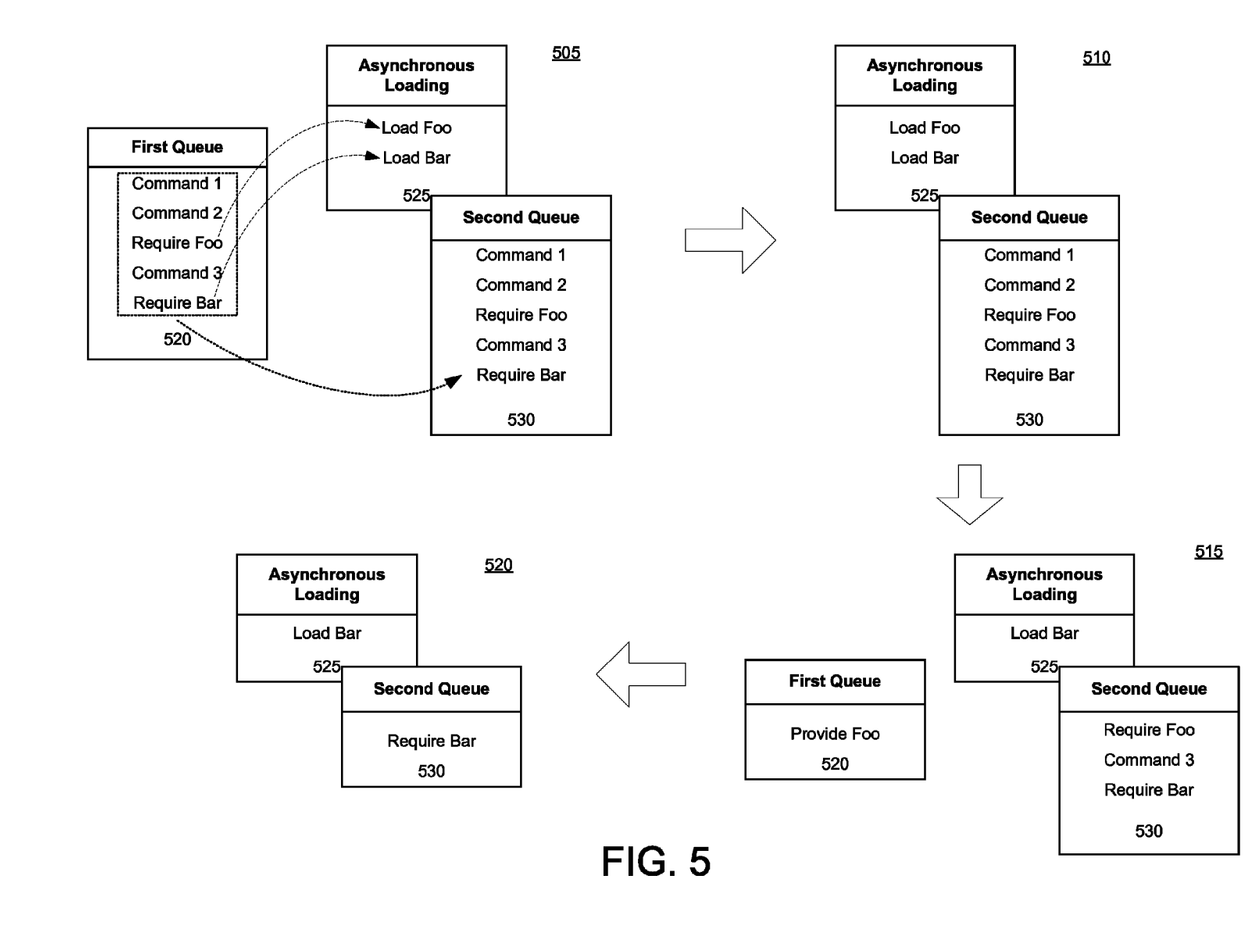
FIG. 5 illustrates an example method for loading a web page.

FIG. 5 provides an examples of using first and second queues for loading a web page. In step 505, a set of commands is provided for execution in a first queue 520. As each of the commands is processed non-dependency and non-fulfillment commands are pushed onto a second queue. For example, Command 1, Command 2, and Command 3 are pushed onto second queue 530 in step 505. If the command is a dependency command, for example "Require Foo" and "Require Bar" in this case, then a secondary executable script referenced in the command (e.g., "Foo" and "Bar") is asynchronously loaded in 525. The dependency command is also pushed onto the second queue 530. Once the set of commands has been processed, the first queue 520 is prepended to the second queue 530. Since there are no additional commands in the first queue 520, only the commands that have been pushed onto the second queue 530 remain.

Commands in the second queue 530 are processed in step 510. For each command in the second queue 530, a determination is made as to whether or not a current command in the second queue is a dependency command. Commands that are not dependency commands are executed and removed from the second queue, as shown in step 515. However, if a current command is determined to be a dependency command, then a determination is made whether the secondary executable script referenced in the dependency command is registered. In this example, neither of the secondary executable scripts referenced in the dependency command (i.e., "Foo" and "Bar") has been registered. If a secondary executable script corresponding to the current command is determined to not be registered, the second queue 530 is appended to the first queue 520. Appending the second queue 530 to the first queue 520 places commands in the second queue 530 behind any commands that are added to the first queue during the processing of the second queue 530. For example, when a secondary executable script (i.e., "Foo") has been completed, a fulfillment command (i.e., "Provide Foo") is pushed onto the first queue 520. In step 515, "Provide Foo" is shown as having been pushed onto first queue 520.

The second queue 530 is subsequently appended to the first queue 520 when the secondary executable script "Require Foo" is determined to not be registered. When the first queue 520 is processed once again, the fulfillment command "Provide Foo" causes the script to be registered. The registration of "Foo" subsequently causes an instance of "Foo" to be attached to a corresponding target object during a subsequent processing of the second queue 530, and the "Require Foo" command is removed from the queue, thus providing for Command 3 to also be executed. However, since secondary executable script "Bar" has yet to be registered, "Require Bar" remains in the second queue 530, as shown in step 520. "Require Bar" will remain in the first queue 520 or second queue 530 until a corresponding fulfillment command (i.e., "Provide Bar") is pushed onto the first queue 520 when secondary executable script has completed loading. The advantage of asynchronously loading secondary executable scripts is to have the scripts loaded in parallel with loading the commands in the internal queue. Otherwise, secondary executable script are prompted to initiate loading only after loading of the entire internal queue.

Figure 6:
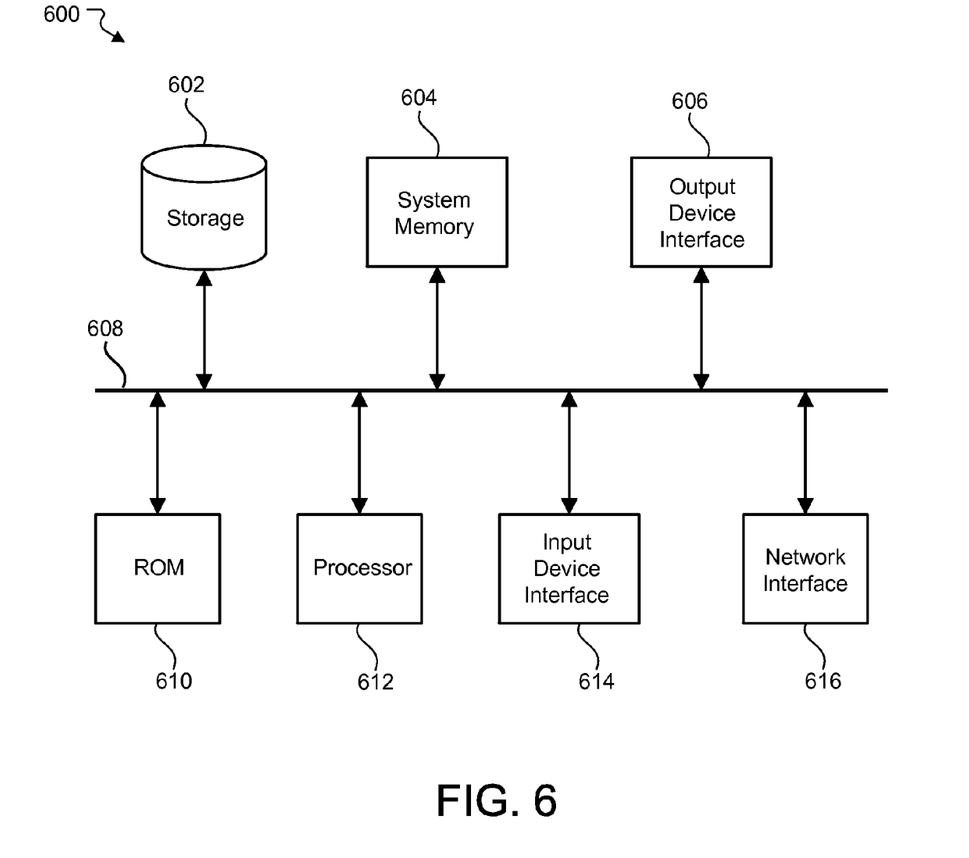
FIG. 6 conceptually illustrates an example electronic system with which some implementations of the subject technology are implemented.

FIG. 6 conceptually illustrates an example electronic system 600 with which some implementations of the subject technology are implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for loading a web page in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interface 606 enables, for example, the display of images generated by the electronic system 600. Output devices used with output device interface 606 include, for example, printers and display devices, such as cathode ray tubes (CRT) or liquid crystal displays (LCD).

Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers, such as a local area network, a wide area network, or an Intranet, or a network of networks, such as the Internet. Any or all components of electronic system 600 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network and a wide area network, an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method for loading a web page, the method comprising:
   asynchronously loading a primary executable script referenced in the web page;
   pushing one or more first commands and one or more second commands associated with the primary executable script onto a first queue;
   determining the one or more first commands in the first queue are a first type of command causing registration of one or more secondary executable scripts called by the primary executable script for execution, wherein the primary executable script is dependent on an output of the one or more secondary executable scripts;
   registering the one or more secondary executable scripts referenced by the one or more first commands in response to determining the one or more first commands in the first queue are the first type of command;
   determining a first set of the one or more second commands are a second type of command that is different from the first type of command, the second type of command causing asynchronous loading of one or more secondary executable scripts referenced by the first set of second commands and not causing registration of the one or more secondary executable scripts referenced by the first set of second commands;
   asynchronously loading the one or more secondary executable scripts referenced by the first set of the second commands in the first queue, and subsequently moving the first set of the second commands from the first queue into a second queue;
   determining a second set of the one or more second commands that are not the first type of command or the second type of command;
   moving the second set of second commands from the first queue into the second queue responsive to determining the second set of second commands are not the first type of command or the second type of command; and
   executing commands of the first queue before executing commands of the second queue such that each secondary executable script is registered before a command of the second queue calls the secondary executable script for execution.

2. The computer-implemented method of claim 1, wherein commands in the first queue are processed after the primary executable script has completed loading.

3. The computer-implemented method of claim 1, wherein commands in the first queue and the second queue are processed in a first-in-first-out order.

4. The computer-implemented method of claim 1 further comprising:
   pushing a command of the first type of command, which causes registration of secondary executable scripts, corresponding to a respective secondary executable script onto the first queue when loading of the respective secondary executable script is completed.

5. The computer-implemented method of claim 1, further comprising:
   determining a second command in the second queue is independent of secondary executable scripts;
   executing the second command in response to determining the second command is independent of secondary executable scripts; and
   removing the second command from the second queue.

6. The computer-implemented method of claim 1, further comprising:
   determining a second command in the second queue references a second secondary executable script;
   determining the second secondary executable script is registered; and
   associating the registered second secondary executable script with an object.

7. The computer-implemented method of claim 6 further comprises:
   removing the second command from the second queue after associating the registered second secondary executable script with the object; and
   appending a fourth command, previously pushed onto the second queue, to the first queue after determining a third secondary executable script referenced in a third command is not registered.

8. The computer-implemented method of claim 7 further comprising:
   pushing a fifth command associated with the primary executable script onto a first queue after appending the fourth command to the first queue.

9. The computer-implemented method of claim 1, further comprising:
   determining a second command in the second queue references a second secondary executable script;
   determining the second secondary executable script is not registered; and
   asynchronously loading the second secondary executable script referenced in the second command.

10. The computer-implemented method of claim 9, wherein at least a portion of the web page is operable while the primary executable script and the second secondary executable script are loading.

11. A non-transitory machine-readable medium comprising instructions stored therein, which when executed by a processor, cause the processor to perform operations comprising:
   asynchronously loading a primary executable script referenced in a web page;
   pushing one or more first commands and one or more second commands associated with the primary executable script onto a first queue;
   determining the one or more first commands in the first queue are a first type of command causing registration of one or more secondary executable scripts called by the primary executable script, wherein the primary executable script is dependent on an output of the one or more secondary executable scripts;
   registering the one or more secondary executable scripts referenced by the one or more first commands in response to determining the one or more first commands in the first queue are the first type of command;
   determining a first set of the one or more second commands are a second type of command that is different from the first type of command, the second type of command causing asynchronous loading of one or more secondary executable scripts referenced by the first set of second commands and not causing registration of the one or more secondary executable scripts referenced by the first set of second commands;
   asynchronously loading the one or more secondary executable scripts referenced by the one or more second commands in the first queue, and subsequently moving the one or more second commands from the first queue into a second queue;
   determining a second set of the one or more second commands that are not the first type of command or the second type of command;
   moving the second set of second commands from the first queue into the second queue responsive to determining the second set of second commands are not the first type of command or the second type of command; and
   executing commands of the first queue before executing commands of the second queue such that each secondary executable script is registered before a command of the second queue calls the secondary executable script for execution.

12. The non-transitory machine-readable medium of claim 11, wherein commands in the first queue are processed after the primary executable script has completed loading.

13. The machine-readable medium of claim 11, the step of asynchronously loading the one or more secondary executable scripts comprising
   asynchronously loading the secondary executable scripts concurrently.

14. The non-transitory machine-readable medium of claim 13 comprising instructions stored therein that cause the processor to perform operations further comprising:
   pushing a command of the first type of command, which causes registration of secondary executable scripts, corresponding to a respective secondary executable script onto the first queue when loading of the respective secondary executable script is completed.

15. The non-transitory machine-readable medium of claim 11 further comprising instructions stored therein, which when executed by a processor, cause the processor to perform operations comprising:
   determining a second command in the second queue references a second secondary executable script;
   determining the second secondary executable script is registered; and
   associating the registered second secondary executable script with an object.

16. The non-transitory machine-readable medium of claim 11 further comprising instructions stored therein, which when executed by a processor, cause the processor to perform operations comprising:
   determining a second command in the second queue references a second secondary executable script;
   determining the second secondary executable script is not registered;
   asynchronously loading the second secondary executable script referenced in the second command; and
   appending a third command to the first queue after determining the second secondary executable script referenced in the second command is not registered.

17. The non-transitory machine-readable medium of claim 16 comprising instructions stored therein that cause the processor to perform operations further comprising:
   pushing a fourth command associated with the primary executable script onto the first queue after appending the third command to the first queue.

18. The non-transitory machine-readable medium of claim 16, wherein at least a portion of the web page is operable while the primary executable script and the second secondary executable script are loading.

19. A system for loading a web page, the system comprising:
   one or more processors; and a non-transitory machine-readable medium comprising instructions stored therein, which when executed by the one or more processors, cause the one or more processors to perform operations comprising:
   asynchronously loading a primary executable script referenced in the web page;
   pushing one or more first commands and one or more second commands associated with the primary executable script onto a first queue;
   determining the one or more first commands in the first queue area first type of command causing registration of one or more secondary executable scripts called by the primary executable script, wherein the primary executable script is dependent on an output of the one or more secondary executable scripts;

registering the one or more secondary executable scripts referenced by the one or more first commands in response to determining the one or more first commands in the first queue are the first type of command;

determining a first set of the one or more second commands are a second type of command that is different from the first type of command, the second type of command causing asynchronous loading of one or more secondary executable scripts referenced by the first set of second commands and not causing registration of the one or more secondary executable scripts referenced by the first set of second commands;

asynchronously loading the one or more secondary executable scripts referenced by the one or more second commands in the first queue and subsequently moving the one or more second commands from the first queue into a second queue;

determining a second set of the one or more second commands that are not the first type of command or the second type of command;

moving the second set of second commands from the first queue into a second queue in response to determining the second set of second commands are not the first type of command or the second type of command; and executing commands of the first queue before executing commands of the second queue such that each secondary executable script is registered before a command of the second queue calls the secondary executable script for execution.

20. The system of claim 19, wherein commands in the first queue are processed after the primary executable script has completed loading.

* * * * *